United States Patent
Tanaka

(10) Patent No.: US 12,524,077 B2
(45) Date of Patent: Jan. 13, 2026

(54) GESTURE RECOGNITION APPARATUS, HEAD-MOUNTED-TYPE DISPLAY APPARATUS, GESTURE RECOGNITION METHOD, AND NON-TRANSITORY COMPUTER READABLE MEDIUM

(71) Applicant: CANON KABUSHIKI KAISHA, Tokyo (JP)

(72) Inventor: Yuki Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 386 days.

(21) Appl. No.: 18/175,568

(22) Filed: Feb. 28, 2023

(65) Prior Publication Data

US 2023/0305634 A1 Sep. 28, 2023

(30) Foreign Application Priority Data

Mar. 22, 2022 (JP) .................. 2022-045114

(51) Int. Cl.
| | | |
|---|---|---|
| *G06V 10/25* | (2022.01) | |
| *G02B 27/01* | (2006.01) | |
| *G06F 3/01* | (2006.01) | |
| *G06T 7/20* | (2017.01) | |
| *G06V 40/10* | (2022.01) | |
| *G06V 40/20* | (2022.01) | |

(52) U.S. Cl.
CPC ........... *G06F 3/017* (2013.01); *G02B 27/017* (2013.01); *G06T 7/20* (2013.01); *G06V 10/25* (2022.01); *G06V 40/10* (2022.01); *G06V 40/28* (2022.01)

(58) Field of Classification Search
CPC ...................................... G06V 40/28
See application file for complete search history.

(56) References Cited

U.S. PATENT DOCUMENTS

| | | | |
|---|---|---|---|
| 7,184,592 B2 | 2/2007 | Iga | |
| 10,296,102 B1* | 5/2019 | Misra | ...................... G06T 7/215 |
| 10,976,829 B1* | 4/2021 | Viswanathan | ......... G06N 20/00 |
| 2015/0261303 A1 | 9/2015 | Tanaka | |

(Continued)

FOREIGN PATENT DOCUMENTS

| | | |
|---|---|---|
| JP | 2015-172887 A | 10/2015 |
| JP | 2019-071048 A | 5/2019 |

OTHER PUBLICATIONS

Extended European Search Report issued by the European Patent Office on Jul. 21, 2023 in corresponding EP Patent Application No. 23159828.5.

*Primary Examiner* — Di Xiao
(74) *Attorney, Agent, or Firm* — Carter, DeLuca & Farrell LLP

(57) ABSTRACT

A gesture recognition apparatus according to the present invention includes at least one memory and at least one processor which function as: a portion detection unit configured to detect from a captured image a portion making a gesture; a recognition unit configured to recognize the gesture on a basis of motion of the portion detected by the portion detection unit; a region detection unit configured to detect from the portion a region to be used for the gesture; and a motion detection unit configured to detect motion of the region detected by the region detection unit, wherein the recognition unit recognizes the gesture on a basis of the motion detected by the motion detection unit.

12 Claims, 6 Drawing Sheets

(56) References Cited

U.S. PATENT DOCUMENTS

| | | | |
|---|---|---|---|
| 2016/0216794 A1* | 7/2016 | Yoon | G06F 3/04166 |
| 2019/0243462 A1 | 8/2019 | Li | |
| 2021/0373671 A1* | 12/2021 | Yang | G02B 30/00 |
| 2022/0171962 A1* | 6/2022 | Zu | G06V 40/113 |
| 2023/0306788 A1 | 9/2023 | Tanaka | |

* cited by examiner

GESTURE RECOGNITION APPARATUS, HEAD-MOUNTED-TYPE DISPLAY APPARATUS, GESTURE RECOGNITION METHOD, AND NON-TRANSITORY COMPUTER READABLE MEDIUM

BACKGROUND OF THE INVENTION

Field of the Invention

The present invention relates to a technology for recognizing gestures.

Description of the Related Art

Technologies for recognizing gestures with the hands, fingers, or the like of users and perform processing according to the recognized gestures have been proposed. With such technologies, the users are enabled to operate an electronic apparatus (an input device of the electronic apparatus) without touching the same by making gestures.

It is disclosed in Japanese Patent Application Laid-open No. 2015-172887 that a hand serving as a portion to make a gesture is extracted from an image obtained by image-capturing the hand, fingers, or the like of a user with a camera, and that the shape of the extracted hand is specified to recognize the gesture.

It is disclosed in Japanese Patent Application Laid-open No. 2019-71048 that deep learning is used to recognize gestures.

However, an electronic apparatus such as smart glasses for AR (Augmented Reality) is transportable and used in various situations. For example, when an operation is assisted by smart glasses, there is a possibility that an operation site is dark or an operator with the smart glasses wears gloves. Therefore, when gestures are recognized by such electronic apparatus, the gestures may not be recognized with high accuracy (the recognition of the gestures becomes unstable) depending on the use situation of the electronic apparatus. For example, the detection of joints or the like (key points to recognize gestures), the specification (recognition) of the shapes of hands or the like (portions to make gestures), or the like may not be performed with high accuracy.

SUMMARY OF THE INVENTION

The present invention provides a technology capable of recognizing gestures with high accuracy under various situations.

The present invention in its first aspect provides a gesture recognition apparatus including at least one memory and at least one processor which function as: a portion detection unit configured to detect from a captured image a portion making a gesture; a recognition unit configured to recognize the gesture on a basis of motion of the portion detected by the portion detection unit; a region detection unit configured to detect from the portion a region to be used for the gesture; and a motion detection unit configured to detect motion of the region detected by the region detection unit, wherein the recognition unit recognizes the gesture on a basis of the motion detected by the motion detection unit.

The present invention in its second aspect provides a head-mounted-type display apparatus including at least one memory and at least one processor which function as a display control unit configured to control display on a basis of a recognition result of the above described gesture recognition apparatus.

The present invention in its third aspect provides a gesture recognition method including: a portion detection step of detecting from a captured image a portion making a gesture; a recognition step of recognizing the gesture on a basis of motion of the portion detected in the portion detection step; a region detection step of detecting from the portion a region to be used for the gesture; and a motion detection step of detecting motion of the region detected in the region detection step, wherein in the recognition step, the gesture is recognized on a basis of the motion detected in the motion detection step.

The present invention in its fourth aspect provides a non-transitory computer readable medium that stores a program, wherein the program causes a computer to execute a gesture recognition method including: a portion detection step of detecting from a captured image a portion making a gesture; a recognition step of recognizing the gesture on a basis of motion of the portion detected in the portion detection step; a region detection step of detecting from the portion a region to be used for the gesture; and a motion detection step of detecting motion of the region detected in the region detection step, wherein in the recognition step, the gesture is recognized on a basis of the motion detected in the motion detection step.

Further features of the present invention will become apparent from the following description of exemplary embodiments with reference to the attached drawings.

DESCRIPTION OF THE EMBODIMENTS

Figure 1:
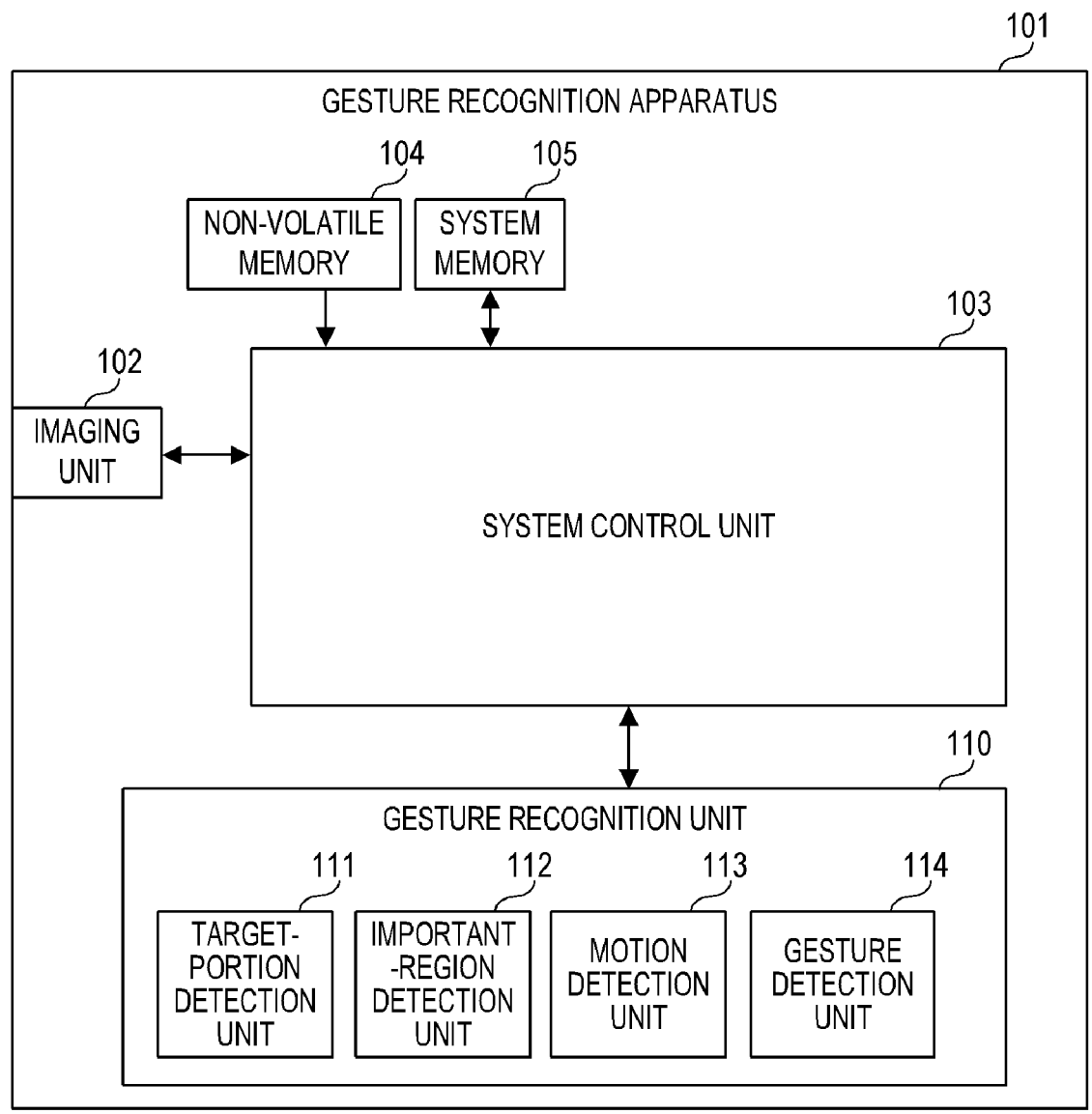
FIG. 1 is a block diagram showing a configuration example of a gesture recognition apparatus.

An embodiment of the present invention will be described. FIG. 1 is a block diagram showing a configuration example of a gesture recognition apparatus 101 in the present embodiment. The gesture recognition apparatus 101 has an imaging unit 102, a system control unit 103, a non-volatile memory 104, a system memory 105, and a gesture recognition unit 110.

The imaging unit 102 has an optical system including a plurality of lenses and an image sensor (for example, a CCD or CMOS sensor) and is arranged to face a direction in which an image of a gesture by a user is capable of being captured. An image sensor is used in the present embodiment, but any sensor available in the recognition of a gesture may only be used. A ranging sensor (for example, a sensor using a laser such as LiDAR (Light Detection and Ranging)) may be used as such.

The non-volatile memory 104 is electrically erasable/recordable memory and is, for example, a Flash-ROM or the like. In the non-volatile memory 104, the operating constant, program, or the like of the system control unit 103 is stored. Here, the program represents, for example, a program for performing the respective processing of a flowchart that will be described later in the present embodiment.

The system memory 105 is, for example, a RAM or the like and develops the operating variable of the system control unit 103, a constant or a program read from the non-volatile memory 104, or the like.

The system control unit 103 is a control unit composed of at least one processor or circuit and controls the entire gesture recognition apparatus 101. The system control unit 103 realizes the respective processing of the flowchart that will be described later by running the program stored in the non-volatile memory 104 described above. The system control unit 103 generates a detection image by applying image processing such as noise reduction and resizing to a captured image obtained from the imaging unit 102 and records the detection image on the system memory 105. Further, the system control unit 103 performs processing according to a gesture recognized by the gesture recognition unit 110. For example, the system control unit 103 generates a control signal corresponding to a recognized gesture and controls the respective units of the gesture recognition apparatus 101 using the control signal.

The gesture recognition unit 110 has a target-portion detection unit 111, an important-region detection unit 112, a motion detection unit 113, and a gesture detection unit 114 and recognizes a gesture on the basis of a captured image (specifically a detection image described above) obtained from the imaging unit 102.

Figure 2:
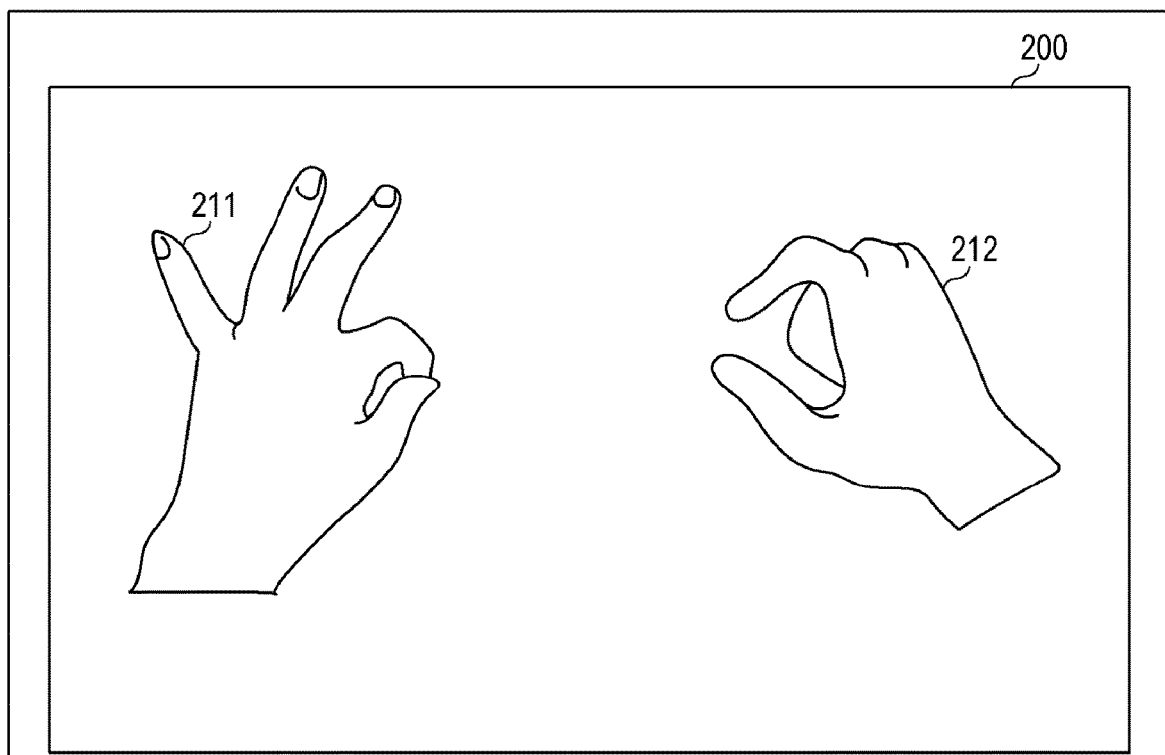
FIG. 2 is a diagram showing a detection example of hands and joints.
Figure 2:
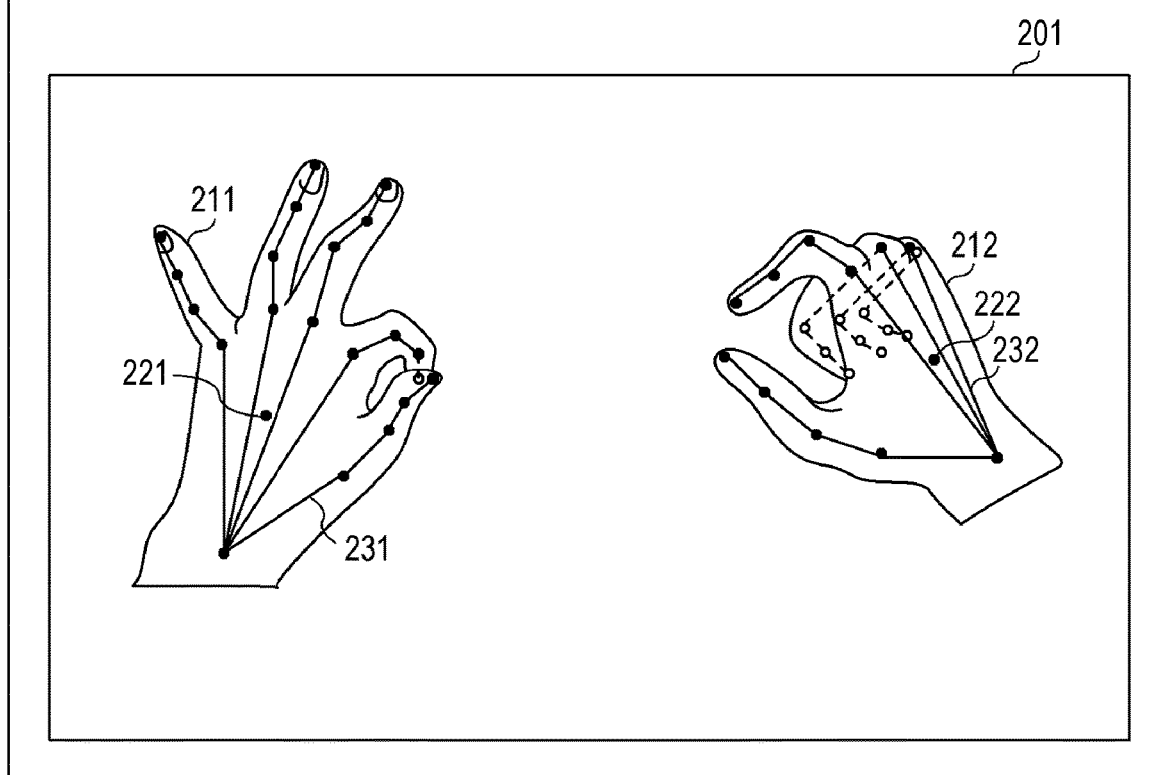
Figure 3A:
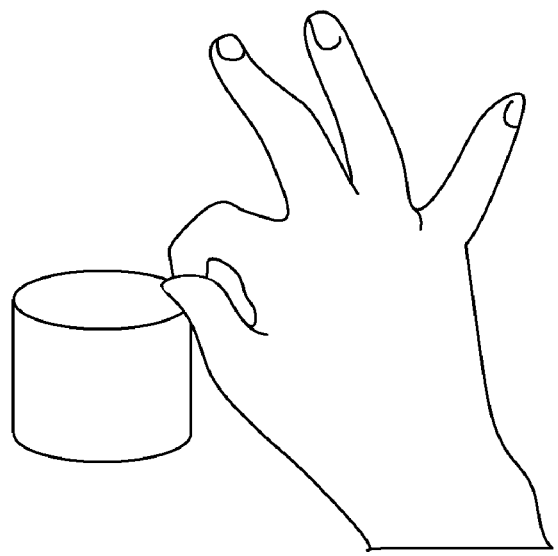
FIGS. 3A and 3B are diagrams for describing an example of an important region according to a gesture.
Figure 3B:
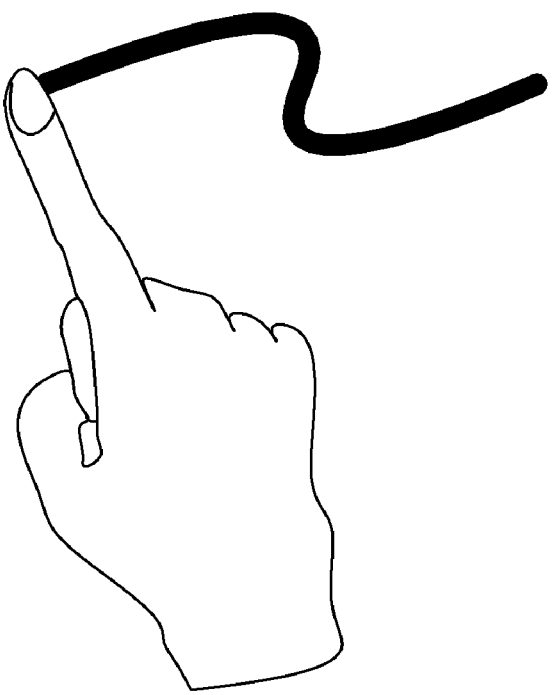
Figure 4:
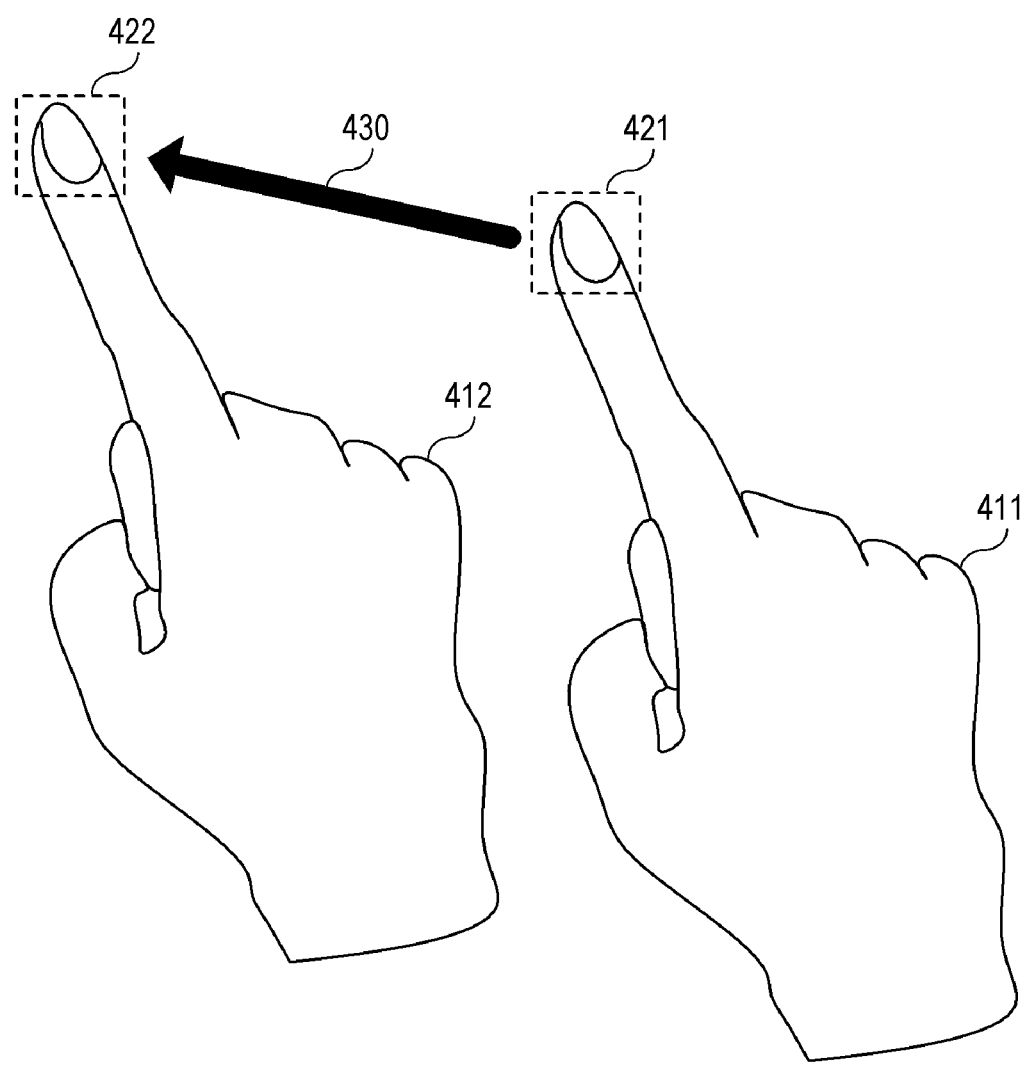
FIG. 4 is a diagram for describing an example of the detection result of a motion detection unit.

The gesture recognition unit 110 will be described in detail using FIGS. 2 to 4. FIG. 2 is a diagram showing a detection example of hands and joints in the present embodiment. FIGS. 3A and 3B are diagrams for describing an example of an important region according to a gesture in the present embodiment. FIG. 4 is a diagram for describing an example of the detection result of the motion detection unit 113 in the present embodiment.

An image 200 shown in FIG. 2 is a detection image obtained by applying image processing to a captured image obtained from the imaging unit 102. In the detection image 200, a left hand 211 and a right hand 212 of a user who makes a gesture (gesture operation) are reflected. An image 201 shown in FIG. 2 is an image obtained by superimposing the detection result of the target-portion detection unit 111 on the detection image 200.

The target-portion detection unit 111 detects (extracts) the hands and joints that are portions (target portions) making a gesture from the detection image 200. In FIG. 2, the positions of 22 spots in total including a hand position (the position of a hand) and the joint positions (the positions of joints) of 21 spots from a wrist to respective fingertips are detected for each of the left hand 211 and the right hand 212. The hand position is, for example, the central position of a hand. The target-portion detection unit 111 obtains joint information on the basis of the joint positions of the 21 spots. A hand position 221 and joint information 231 are obtained for the left hand 211, and a hand position 222 and joint information 232 are obtained for the right hand 212. The joint information 231 and 232 show the joint positions of the 21 spots and a plurality of line segments connecting the joint positions of the 21 spots together so as to form a skeletal frame. Note that a user makes a gesture with hands or fingers in the present embodiment but may make a gesture with his/her arms, feet, eyes, mouth, or the like.

The important-region detection unit 112 detects an important region that is a region to be (mainly) used for a gesture from target portions (hands and joints) detected by the target-portion detection unit 111. For example, the important-region detection unit 112 selects an important portion that is a portion to be (mainly) used for a gesture from a plurality of target portions detected by the target-portion detection unit 111 and determines the region of the selected important portion as an important region. The important region is different depending on the type of a gesture. FIGS. 3A and 3B show an example of a gesture. FIG. 3A shows a pinch operation (pinch operation with a thumb and an index finger), and FIG. 3B shows a drag operation (movement operation) with an index finger. The pinch operation is performed mainly by the movement of the tip ends of a thumb and an index finger. Therefore, the important-region detection unit 112 detects the regions of the tip ends of the thumb and the index finger as important regions during the pinch operation. The drag operation (drag operation with an index finger) is performed mainly by the movement of the tip end of an index finger. Therefore, the important-region detection unit 112 detects the region of the tip end of the index finger as an important region during the drag operation. Note that a gesture is not limited to the pinch operation or the drag operation. By setting information on the corresponding relationship between gestures and important regions and storing the same in the non-volatile memory 104 in advance, the important-region detection unit 112 is enabled to detect an important region corresponding to a gesture being made using the information on the corresponding relationship.

The motion detection unit 113 detects the motion of an important region detected by the important-region detection unit 112 on the basis of the detection result of the important-region detection unit 112. In FIG. 4, a region 421 of the tip end of the index finger of a hand 411 was detected as an important region in the past. For example, the motion detection unit 113 detects a movement region 422 corresponding to the important region 421 from a current detection image using various methods such as block matching to detect motion 430 from the important region 421 to the movement region 422. As the movement region 422, the region of the tip end of the index finger of a hand 412 (identical with the hand 411) is detected. The motion detection unit 113 is enabled to detect a movement region or the motion of an important region by calculating the motion vector of a characteristic point (for example, a joint position) in the important region.

The gesture detection unit 114 detects (recognizes) a gesture on the basis of the motion of target regions (hands and joints) detected by the target-portion detection unit 111. In the present embodiment, the gesture detection unit 114 detects a gesture using the detection result (a hand position and joint information) of the target-portion detection unit 111 or the detection result (the motion of an important region) of the motion detection unit 113. The gesture detection unit 114 detects a gesture by, for example, comparing the detection result of the target-portion detection unit 111 or the motion detection unit 113 with a gesture model stored in advance in the non-volatile memory 104. Note that a method for detecting a gesture is not limited to this, and a gesture may be detected using a detector having been learned by deep learning or the like. In the case of using deep learning, it is possible to detect, from the time-series data of joint information, a gesture (such as a gesture to draw a circle with a finger) that is not detectable from the data of one frame by using RNN (Recurrent Neural Network). A gesture detectable by the gesture detection unit 114 is not limited to one, but the gesture detection unit 114 may detect a plurality of gestures.

Figure 5:
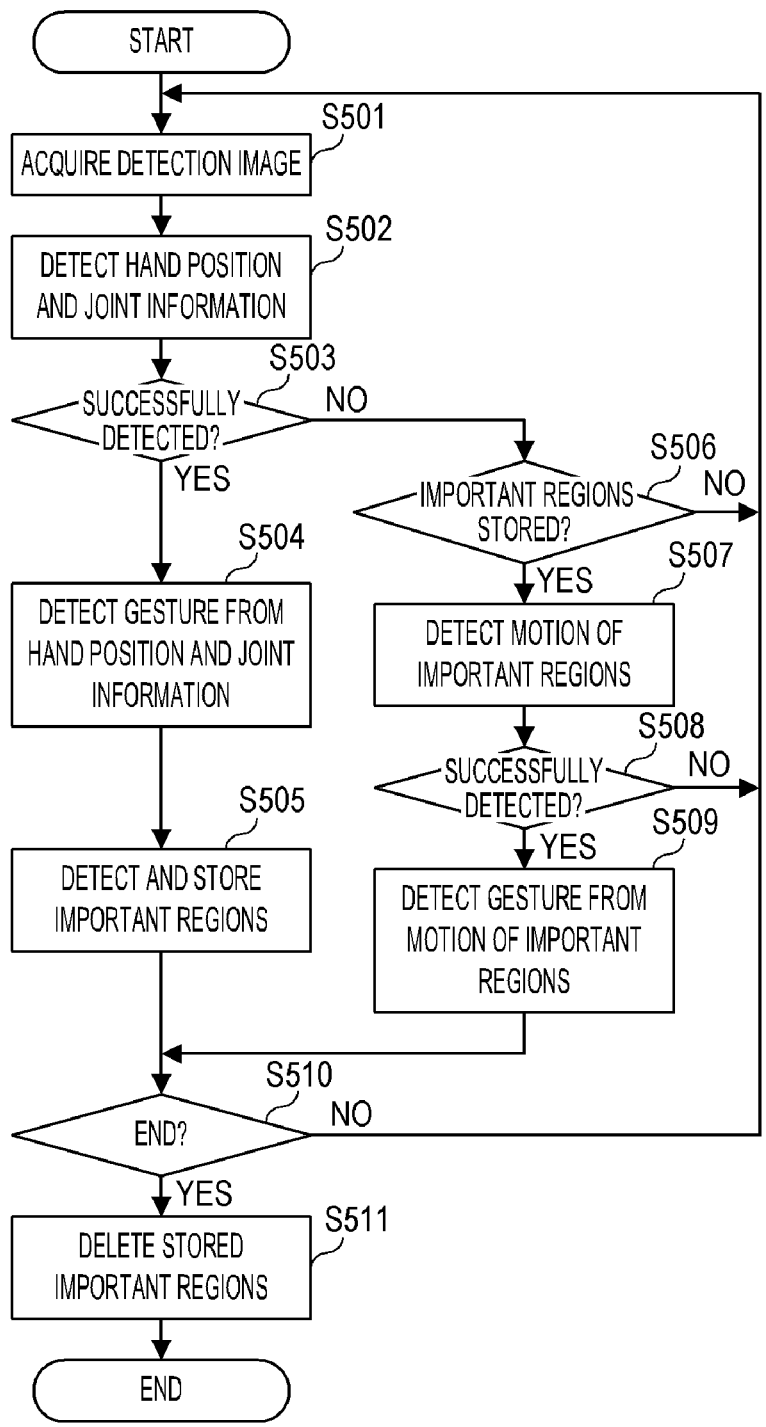
FIG. 5 is a flowchart showing an example of gesture recognition processing.
Figure 6:
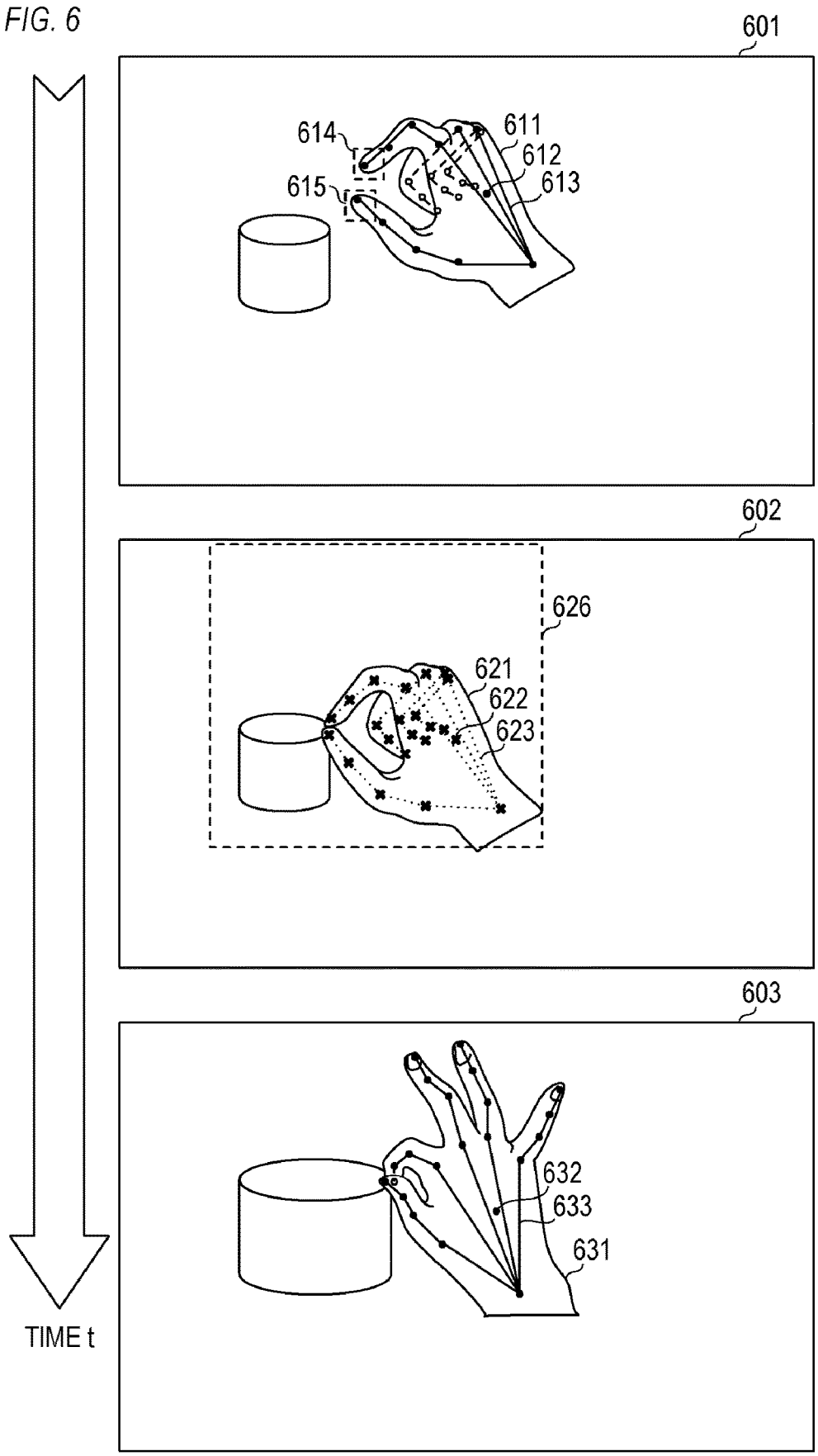
FIG. 6 is a diagram for describing an example of the gesture recognition processing.

Gesture recognition processing in the present embodiment will be described. FIG. 5 is a flowchart showing an example of the gesture recognition processing in the present embodiment. This processing is realized when the system control unit 103 develops a program stored in the nonvolatile memory 104 into the system memory 105 and runs the same. For example, the processing of FIG. 5 starts when the gesture recognition apparatus 101 activates. FIG. 6 is a diagram for describing an example of the gesture recognition processing in the present embodiment. In FIG. 6, detection images 601 to 603 are arranged in chronological order. The detection image 601 is the oldest, and the detection image 603 is the newest. A hand 611 is reflected in the detection image 601, a hand 621 is reflected in the detection image 602, and a hand 631 is reflected in the detection image 603. The hands 611, 621, and 631 are the identical.

In step S501, the system control unit 103 acquires a captured image from the imaging unit 102 and applies image processing to the captured image to generate (acquire) the detection image 601.

In step S502, the system control unit 103 acquires, using the target-portion detection unit 111, a hand position 612 and joint information 613 from the detection image 601 generated in step S501.

In step S503, the system control unit 103 determines whether the hand position 612 and the joint information 613 have been successfully acquired in step S502. The processing proceeds to step S504 when the hand position 612 and the joint information 613 have been successfully acquired. Otherwise, the processing proceeds to step S506. When a part of a target portion (for example, a part of joints) has not been detected, imperfect joint information is obtained. Therefore, the processing proceeds to step S506. Here, it is assumed that the hand position 612 and the joint information 613 have been successfully acquired and the processing proceeds to step S504.

In step S504, the system control unit 103 detects (recognizes), using the gesture detection unit 114, a gesture from the hand position 612 and the joint information 613 acquired in step S502. Note that the system control unit 103 may detect a gesture using only a hand position and joint information acquired from one detection image or detect a gesture using a hand position and joint information acquired from each of a plurality of detection images acquired until the present.

In step S505, the system control unit 103 detects important regions 614 and 615 from the hand 611 using the important-region detection unit 112 and stores the data of the important regions 614 and 615 in the system memory 105. The data of the important regions stored in the system memory 105 may be the data of an image of the important regions cut out from the detection image or the data of the characteristics (characteristic points) of the image of the important regions. In step S505, the system control unit 103 detects important regions corresponding to the gesture detected in step S504. When having failed to detect the gesture in step S504, the system control unit 103 detects important regions corresponding to a gesture capable of being made at the hand position 612. Therefore, detected important regions are different depending on a hand position. When a plurality of gestures are capable of being made at the hand position 612, the system control unit 103 may detect the region of the hand 611 as an important portion or may detect the region of a target portion to be most-frequently used for a gesture among a plurality of target portions (for example, a plurality of joints) as an important portion.

In step S510, the system control unit 103 determines whether to end the gesture recognition processing. The processing proceeds to step S511 when the system control unit 103 ends the gesture recognition processing. In step S511, the system control unit 103 deletes the data of the important regions stored in the system memory 105. Then, the system control unit 103 ends the gesture recognition processing. The processing returns to step S501 when the system control unit 103 does not end the gesture recognition processing. Here, it is assumed that the processing returns to step S501. The system control unit 103 acquires a new detection image 602 in step S501 and acquires a hand position 622 and joint information 623 in step S502. Then, the processing proceeds to step S503.

In step S503, the system control unit 103 determines whether the hand position 622 and the joint information 623 have been successfully acquired in step S502. The processing proceeds to step S504 when the system control unit 103 has succeeded in acquiring the hand position 622 and the joint information 623. Otherwise, the processing proceeds to step S506. Here, it is assumed that a part of the information (the hand position 622 and the joint information 623) has not been successfully acquired and the processing proceeds to step S506.

In step S506, the system control unit 103 determines whether the data of important regions is stored in the system memory 105. When the data of the important regions is stored, the processing proceeds to step S507. Otherwise, the processing returns to step S501. Here, it is assumed that the data of important regions 614 and 615 is stored and the processing proceeds to step S507.

In step S507, the system control unit 103 detects two movement regions corresponding to the important regions 614 and 615, respectively, from the detection image 602 using the data of the important regions 614 and 615 acquired in step S506 and detects the motion of the important regions 614 and 615. The system control unit 103 may detect movement regions from the entire region of the detection image 602 but may limit a region in which the movement regions are detected to a specific region 626 that is a part of the detection image 602 or the like on the basis of the positions of the important regions 614 and 615 or the like.

In step S508, the system control unit 103 determines whether the motion of the important regions 614 and 615 has been successfully detected in step S507. The processing proceeds to step S509 when the motion of the important regions 614 and 615 has been successfully detected. Otherwise, the processing returns to step S501. If parts corresponding to the important regions 614 and 615 are positioned outside the detection image 602 or hidden behind another object, the motion of the important regions 614 and 615 is not successfully detected. In this case, the processing returns to step S501. Here, it is assumed that the motion of the important regions 614 and 615 has been successfully detected and the processing proceeds to step S509.

In step S509, the system control unit 103 detects a gesture from the motion of the important regions 614 and 615 detected in step S507 using the gesture detection unit 114. At this time, the system control unit 103 may additionally use the hand position 612 and the joint information 613 acquired in the past.

In step S510, the system control unit 103 determines whether to end the gesture recognition processing. The processing proceeds to step S511 when the system control unit 103 ends the gesture recognition processing. Otherwise, the processing returns to step S501. Here, it is assumed that the processing returns to step S501. The system control unit 103 acquires a new detection image 603 in step S501 and acquires a hand position 632 and joint information 633 in step S502. Then, the processing proceeds to step S503.

As described above, a gesture is recognized on the basis of the motion of regions to be used for the gesture among portions making the gesture according to the present embodiment. In this manner, it is possible to recognize gestures with high accuracy under various environments.

Note that the above embodiment is only an example and configurations obtained by appropriately deforming or modifying the above configurations within the range of the gist of the present invention are also included in the present invention. For example, the gesture recognition apparatus 101 may be provided in an electronic apparatus (head-mounted type display apparatus) such as smart glasses for AR (Augmented Reality). In this case, a display control unit provided in the head-mounted type display apparatus controls display on the basis of the recognition result of the gesture recognition apparatus 101. The gesture recognition apparatus 101 (the gesture recognition unit 110) may be electronic apparatus separate from the head-mounted type display apparatus and may be, for example, a computer (server) on a cloud.

According to the present invention, it is possible to recognize gestures with high accuracy under various environments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-045114, filed on Mar. 22, 2022, which is hereby incorporated by reference herein in its entirety.

What is claimed is:

1. A gesture recognition apparatus comprising:
    a processor; and
    a memory storing a program which, when executed by the processor, causes the gesture recognition apparatus to:
        execute portion detection processing to detect from a captured image a portion making a gesture;
        execute recognition processing to recognize the gesture on a basis of motion of the portion detected in the portion detection processing;
        execute region detection processing to detect a region to be used for the gesture;
        execute storing processing to store the region detected in the region detection processing; and
        execute motion detection processing to detect motion of the region detected in the region detection processing in a case where the portion is not detected in the portion detection processing and the region is stored in the storing processing, wherein
    in the recognition processing the gesture is recognized on a basis of the motion detected in the motion detection processing in a case where the motion is detected in the motion detection processing.

2. The gesture recognition apparatus according to claim 1, wherein,
    in the motion detection processing, the motion of the region detected in the region detection processing is detected in a case where a part of the portion is not detected in the portion detection processing and the region is stored in the storing processing.

3. The gesture recognition apparatus according to claim 1, wherein
    in the region detection processing, a region to be detected is changed, depending on a type of the gesture recognized in the recognition processing.

4. The gesture recognition apparatus according to claim 3, wherein
    in the portion detection processing, a hand is detected from the captured image, and
    in the region detection processing, a region of a tip end of a thumb and a region of a tip end of an index finger are detected in a case where the gesture recognized in the recognition processing is a pinch operation.

5. The gesture recognition apparatus according to claim 3, wherein
    in the portion detection processing, a hand is detected from the captured image, and
    in the region detection processing, a region of a tip end of an index finger is detected in a case where the gesture recognized in the recognition processing is a drag operation.

6. The gesture recognition apparatus according to claim 1, wherein
    in the region detection processing, a region to be detected is changed, depending on a position of the portion detected in the portion detection processing.

7. The gesture recognition apparatus according to claim 1, wherein,
    in the region detection processing, a region of a portion to be most-frequently used for the gesture among a plurality of portions is detected in a case where the plurality of portions are detected in the portion detection processing.

8. The gesture recognition apparatus according to claim 1, wherein the program, when executed by the processor, further causes the gesture recognition apparatus to execute generation processing configured to generate a control signal corresponding to the gesture recognized in the recognition processing.

9. A head-mounted-type display apparatus configured to control display on a basis of a recognition result of the gesture recognition apparatus according to claim 1.

10. A gesture recognition method comprising:

a portion detection step of detecting from a captured image a portion making a gesture;

a recognition step of recognizing the gesture on a basis of motion of the portion detected in the portion detection step;

a region detection step of detecting a region to be used for the gesture;

a storing step of storing the region detected in the region detection step; and a motion detection step of detecting motion of the region detected in the region detection step in a case where the portion is not detected in the portion detection step and the region is stored in the storing step, wherein in the recognition step, the gesture is recognized on a basis of the motion detected in the motion detection step in a case where the motion is detected in the motion detection step.

11. A non-transitory computer readable medium that stores a program, wherein the program causes a computer to execute a gesture recognition method comprising:

a portion detection step of detecting from a captured image a portion making a gesture;

a recognition step of recognizing the gesture on a basis of motion of the portion detected in the portion detection step;

a region detection step of detecting a region to be used for the gesture;

a storing step of storing the region detected in the region detection step; and a motion detection step of detecting motion of the region detected in the region detection step in a case where the portion is not detected in the portion detection step and the region is stored in the storing step, wherein in the recognition step, the gesture is recognized on a basis of the motion detected in the motion detection step in a case where the motion is detected in the motion detection step.

12. The gesture recognition apparatus according to claim 1, wherein the program, when executed by the processor, further causes the gesture recognition apparatus to execute control processing to control an electronic apparatus on a basis of the gesture recognized in the recognition processing.

* * * * *